(12) United States Patent
Cotnoir et al.

(10) Patent No.: US 7,992,887 B2
(45) Date of Patent: Aug. 9, 2011

(54) TRAILER HITCH FOR A VEHICLE HAVING A SINGLE REAR WHEEL

(75) Inventors: Thierry Cotnoir, Sherbrooke (CA);
Eric Charlebois, St-Germain-de-Grantham (CA);
Pierre-Luc Robillard, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 61 days.

(21) Appl. No.: 12/642,150

(22) Filed: Dec. 18, 2009

(65) Prior Publication Data

US 2011/0147107 A1 Jun. 23, 2011

(51) Int. Cl.
*B60D 1/50* (2006.01)
(52) U.S. Cl. .......... 280/483; 280/204; 280/501
(58) Field of Classification Search .......... 280/476.1, 280/204, 411.1, 492, 495, 501, 503, 511, 280/506, 483, 485, 486
See application file for complete search history.

(56) References Cited

U.S. PATENT DOCUMENTS

| | | | |
|---|---|---|---|
| 4,511,155 A * | 4/1985 | Galloway | 280/204 |
| 4,536,001 A * | 8/1985 | Wagner | 280/837 |
| 5,853,057 A * | 12/1998 | Mullins | 180/16 |
| 6,155,588 A | 12/2000 | Maxey | |
| 6,431,570 B1 * | 8/2002 | Lennon et al. | 280/204 |
| 6,454,289 B1 * | 9/2002 | Mullins | 280/476.1 |
| 6,834,879 B1 | 12/2004 | Lorman | |
| 7,044,493 B1 | 5/2006 | Wilson | |
| 7,093,845 B1 | 8/2006 | Fast | |
| 7,121,575 B2 * | 10/2006 | Finch | 280/489 |
| 7,377,536 B2 | 5/2008 | Rehme | |
| 7,380,811 B2 | 6/2008 | Rehme | |
| 7,641,214 B2 | 1/2010 | Khal | |
| 2004/0262883 A1 | 12/2004 | Kerins et al. | |
| 2007/0170693 A1 | 7/2007 | Marcy | |

* cited by examiner

*Primary Examiner* — Joanne Silbermann
*Assistant Examiner* — Tashiana Adams
(74) *Attorney, Agent, or Firm* — Osler, Hoskin & Harcourt LLP

(57) ABSTRACT

A trailer hitch for a single rear wheeled vehicle having a single rear wheel mounted between left and right arms comprises left and right hitch arms having first and second ends. The first ends have first apertures. The second ends are connected together. Shock absorbing bushings are disposed inside the first apertures. Left and right mounting brackets have first and second ends. The first ends of the mounting brackets have first apertures and are fastened to the hitch arms, and the second ends connect to the arms. Fasteners pass through the shock absorbing bushings and through the first aperture of the first end of the mounting brackets to fasten the mounting brackets to the hitch arms. A trailer connector is connected to the second ends of the left and right hitch arms. A vehicle having a trailer hitch is also disclosed.

14 Claims, 7 Drawing Sheets

TRAILER HITCH FOR A VEHICLE HAVING A SINGLE REAR WHEEL

FIELD OF THE INVENTION

The present invention relates to trailer hitches and more specifically to trailer hitches for vehicles having a single rear wheel.

BACKGROUND OF THE INVENTION

A trailer is a wheeled storage compartment that can be attached to the rear of a vehicle by way of a hitch. In the case of a vehicle having two rear wheels, the hitch is usually connected to the frame at mid-width of the vehicle. In the case of a single rear wheeled vehicle, the hitch is usually hooked to the swing arm supporting the rear wheel or to the frame.

The swing arm is movably connected to the frame of the single rear wheel vehicle, and has an arm disposed on each side of the wheel. A suspension is disposed between the swing arm and the frame such that displacements of the swing arm due to unevenness of the road and accelerations/decelerations are dampened before they reach the frame of the vehicle.

Therefore, when a trailer is attached to the rear swing arm, vibrations and movements of the swing arm are transmitted to the trailer. Such movements can render the trailer unstable.

Therefore, there is a need for a trailer hitch for a single rear wheel vehicle that would reduce transmission of motion between the swing arm and the trailer.

SUMMARY OF THE INVENTION

It is an object of the present invention to ameliorate at least some of the inconveniences mentioned above.

It is also an object of the present invention to provide a trailer hitch removably mounted onto the swing arm of the rear wheel of a single rear wheel vehicle that dampens transmission of motions between the swing arm and the trailer.

In one aspect, the invention provides a trailer hitch for a single rear wheeled vehicle. The single rear wheel vehicle comprises a single rear wheel mounted between left and right arms. The trailer hitch comprises a left hitch arm having first and second ends. The first end has a first aperture. A right hitch arm has first and second ends. The first end has a first aperture. The second end of the right hitch arm is connected to the second end of the left hitch arm. A left shock absorbing bushing is disposed inside the first aperture of the first end of the left hitch arm. A right shock absorbing bushing is disposed inside the first aperture of the first end of the right hitch arm. A left mounting bracket has first and second ends. The first end has a first aperture. The first end is fastened to the first end of the left hitch arm. The second end is adapted to connect to the left arm. A right mounting bracket has first and second ends. The first end has a first aperture. The first end is fastened to the first end of the right hitch arm. The second end is adapted to connect to the right arm. A left fastener fastens the left mounting bracket to the left hitch arm. The left fastener passes through the left shock absorbing bushing and through the first aperture of the first end of the left mounting bracket. A right fastener fastens the right mounting bracket to the right hitch arm. The right fastener passes through the right shock absorbing bushing and through the first aperture of the first end of the right mounting bracket. A trailer connector connected to the second ends of the left and right hitch arms. The trailer connector is adapted to connect to a trailer.

In a further aspect, a left sleeve is disposed between the left fastener and an inside of the left shock absorbing bushing. A right sleeve is disposed between the right fastener and an inside of the right shock absorbing bushing.

In an additional aspect, a mud guard is connected to the left and right hitch arms.

In a further aspect, the left and right mounting brackets are adapted to prevent rotation between the left and right hitch arms and their corresponding left and right arms.

In an additional aspect, the left and right hitch arms are fixedly connected together to form a generally U-Shape.

In a further aspect, the left and right hitch arms are integrally formed.

In an additional aspect, the first ends of the left and right hitch arms have a generally rectangular cross-section. The first ends of the left and right mounting brackets are generally U-shaped.

In an additional aspect, when the left and right mounting brackets are connected to the left and right arms respectively the first ends of the left and right hitch arms are spaced from ends of the left and right arms respectively.

In a further aspect, the left and right sleeves are first left and right sleeves. The left and right shock absorbing bushings are first left and right shock absorbing bushings. The left and right fasteners are first left and right fasteners. The first end of the left hitch arm has a second aperture. The first end of the right hitch arm has a second aperture. The first end of the left mounting bracket has a second aperture. The first end of the right mounting bracket has a second aperture. A second left shock absorbing bushing is disposed inside the second aperture of the first end of the left hitch arm. A second right shock absorbing bushing is disposed inside the second aperture of the first end of the right hitch arm. A second left sleeve is disposed inside the second left bushing. A second right sleeve is disposed inside the second right bushing. A second left fastener fastens the left mounting bracket to the left hitch arm. The second left fastener passes through the second aperture of the first end of the left mounting bracket and the second left sleeve. A second right fastener fastens the right mounting bracket to the right hitch arm. The second right fastener passes through the second aperture of the first end of the right mounting bracket and the second right sleeve.

In an additional aspect, the single rear wheel is mounted onto a rear wheel shaft, the rear wheel shaft being hollow and open ended. At least one fastener fastens the left mounting bracket to the left arm and the right mounting bracket to the right arm. In a further aspect, the trailer hitch further comprises an aperture at the second end of the left mounting bracket and an aperture at the second end of the right mounting bracket. The at least one fastener includes a clamping shaft extending between the left and right arms. The clamping shaft fastens the second ends of the left and right mounting brackets to corresponding left and right arms. The clamping shaft is adapted to be disposed inside the rear wheel shaft, the clamping shaft extending through the aperture of the second ends of the left and right mounting brackets.

In an additional aspect, the rear wheel shaft is connected to the left and right arms by left and right rear wheel fasteners respectively. The second end of the left mounting bracket comprises a protrusion disposed around the aperture of the second end of the left mounting bracket. The left rear wheel fasteners are disposed between the left arm and the protrusion. The second end of the right mounting bracket comprises a protrusion disposed around the aperture of the second end of the right mounting bracket. The right rear wheel fasteners are disposed between the right arm and the protrusion.

In a further aspect, a left pad is disposed between the second end of left mounting bracket and the left arm. The left pad comprises an indentation such that the left pad is disposed at least partially around the left rear wheel shaft fasteners. A right pad is disposed between the second end of left mounting bracket and the left arm. The right pad comprises an indentation such that the right pad is disposed at least partially around the right rear wheel shaft fasteners.

In another aspect, the invention provides a single rear wheel vehicle comprising a frame having a front portion and a rear portion. An engine is supported by the frame. At least two wheels are connected to the frame. At least one of the at least two wheels is operatively connected to the engine to propel the vehicle. At least one of the at least two wheels is a rear wheel. A steering assembly is supported by the frame and is operatively connected to at least one of the at least two wheels to steer the vehicle. A rear suspension arm is connected to the frame. The rear wheel is mounted on the rear suspension arm. The rear suspension arm comprises left and right arms. A trailer hitch is connected to the rear suspension arm. The trailer hitch has a left hitch arm having first and second ends. The first end has a first aperture. A right hitch arm has first and second ends. The first end has a first aperture. The second end of the right hitch arm is connected to the second end of the left hitch arm. A left shock absorbing bushing is disposed inside the first aperture of the first end of the left hitch arm. A right shock absorbing bushing is disposed inside the first aperture of the first end of the right hitch arm. A left mounting bracket has first and second ends. The first end has a first aperture. The first end is fastened to the first end of the left hitch arm. The second end is connected to the left arm. A right mounting bracket has first and second ends. The first end has a first aperture. The first end is fastened to the first end of the right hitch arm. The second end is connected to the right arm. A left fastener fastens the left mounting bracket to the left hitch arm. The left fastener passes through the left shock absorbing bushing and through the first aperture of the first end of the left mounting bracket and. A right fastener fastening the right mounting bracket to the right hitch arm. The right fastener passes through the right shock absorbing bushing and through the first aperture of the first end of the right mounting bracket. A trailer connector is connected to the second ends of the right and left hitch arms. The trailer connector is adapted to connect to a trailer.

For the purpose of this application, terms related to spatial orientation such as downwardly, rearwardly, forward, front, rear, left, and right, are as they would normally be understood by a driver of the vehicle sitting thereon in a normal driving position.

It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a three-wheel vehicle having a single rear wheel. However, it should be understood that other types of vehicles having a single rear wheel such as motorcycles are also considered.

Figure 1:
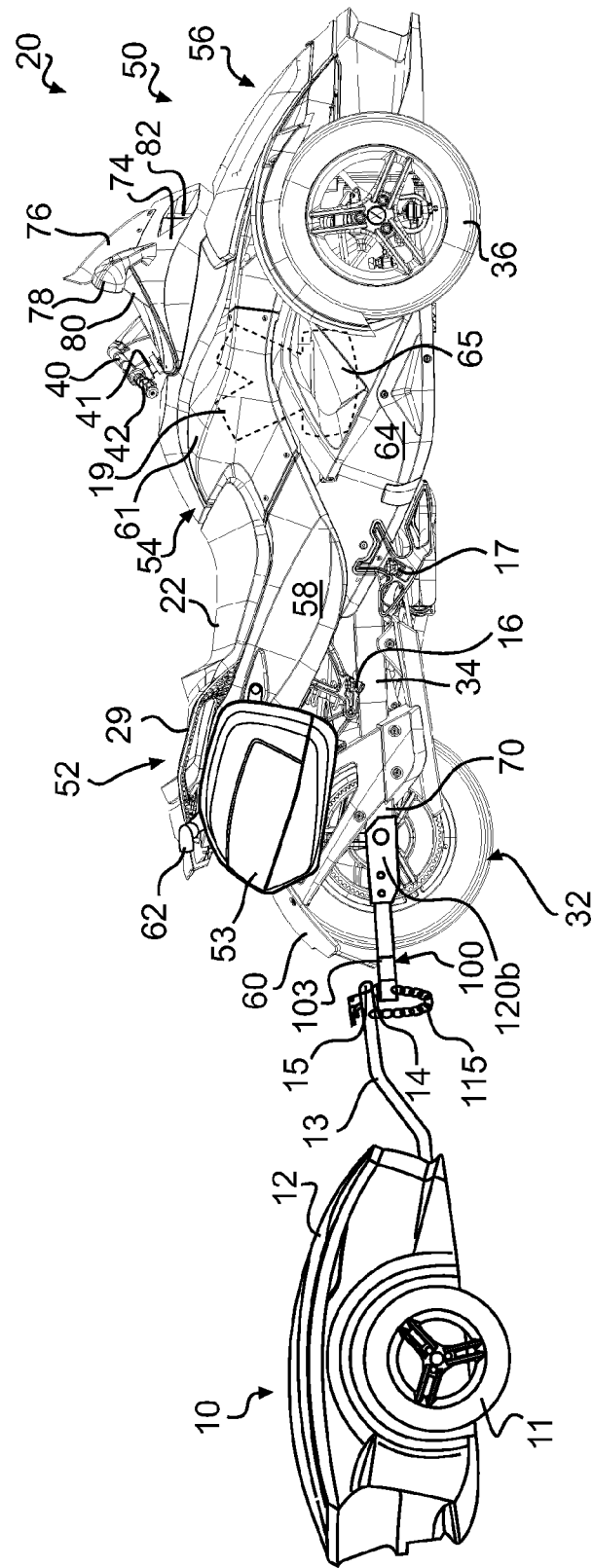
FIG. 1 is a right side elevational view of a three-wheel vehicle having a single rear wheel assembly and having a trailer hitch according to an embodiment of the present invention with a trailer attached thereto.
Figure 2:
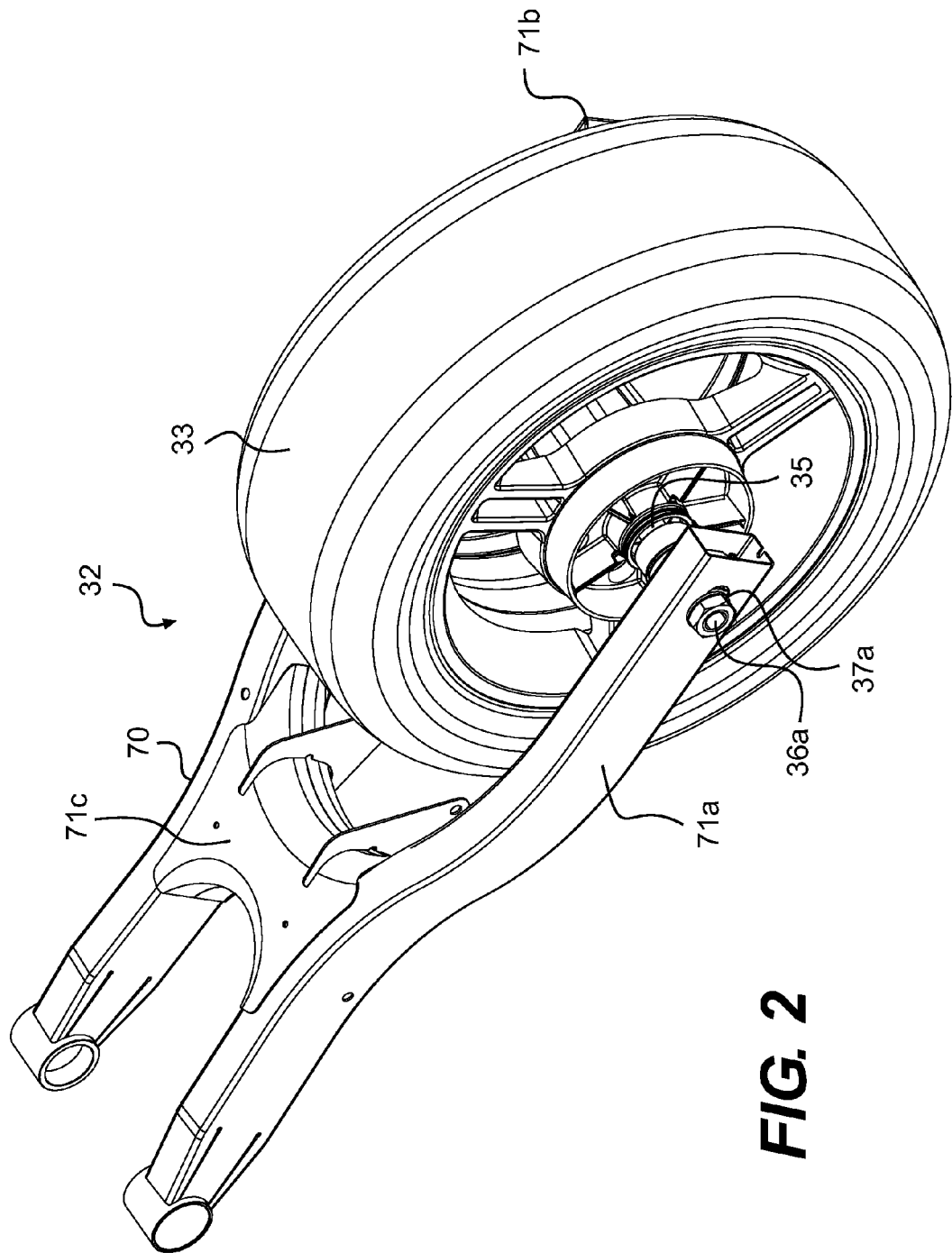
FIG. 2 is a rear, left perspective view of the single rear wheel assembly of the three-wheel vehicle of FIG. 1.
Figure 3:
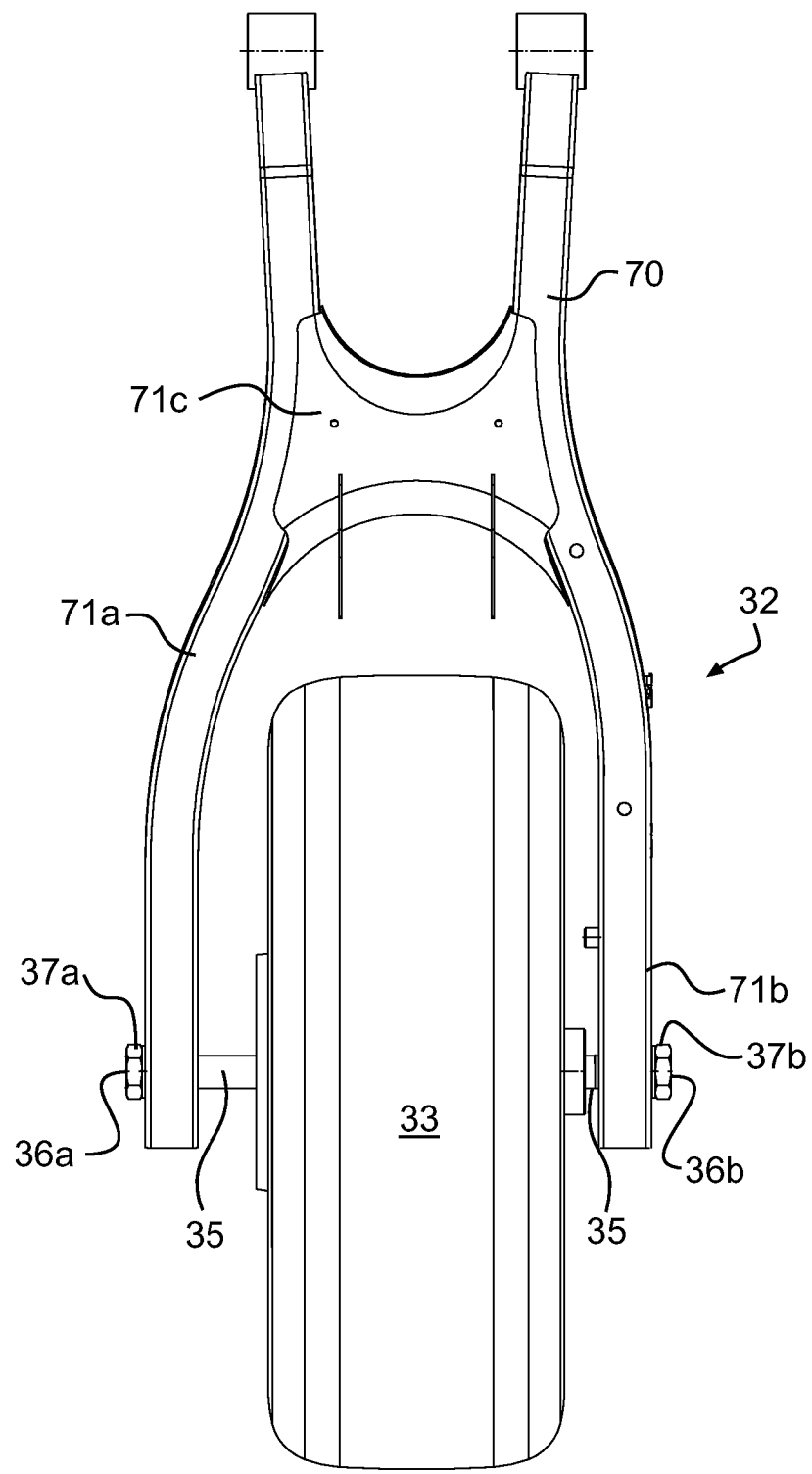
FIG. 3 is a top plan view of the single rear wheel assembly of FIG. 2 with some elements removed for clarity.

FIGS. 1 to 3 illustrate a three-wheel vehicle 20 having a trailer hitch 100 in accordance with one embodiment of the invention. The three-wheel vehicle 20 is a straddle-type vehicle comprising a straddle seat 22 adapted to accommodate one or two adult sized riders. The straddle seat 22 includes a forward seat portion for the driver and a rear seat portion for a passenger. Handles 29 are provided on both sides of the rear seat segment for the passenger sitting thereon to grip with his hands to maintain his balance. Left and right foot pegs 17 (only the right one being shown) and left and right foot pegs 16 (only the right one being shown) are used by the driver and the passenger respectively, for resting their feet onto during riding. It is contemplated that the three-wheel vehicle 20 could not have the rear seat portion, and be adapted to accommodate only the driver and that accordingly the three-wheel vehicle 20 would not have the handles 29 and would have only the pair of foot pegs 17.

The three-wheel vehicle 20 includes a frame (not shown) underneath the bodywork 50 of the vehicle 20. The frame supports and houses an engine 19 (schematically shown in FIG. 1) located between the straddle seat 22 and left and right front wheel assemblies 36 (only the right one being shown). The engine 19 could be any type of power source such as an internal combustion engine or an electric motor if desired. A single rear wheel assembly 32 with a tire suitable for road use is suspended from the vehicle 20 via a rear suspension system 34 at the rear of the frame. The rear wheel assembly 32 will be described in greater details below with respect to FIGS. 2 and 3. The rear suspension system 34 is connected to a suspension arm in the form of a swing arm 70 supporting the single rear wheel assembly 32. It is contemplated that the vehicle could have a suspension arm rigidly mounted to the frame without any rear suspension system. The swing arm 70 will be described in greater detail below. The single rear wheel assembly 32 is operatively connected to the engine 19 through any suitable power transmission mechanism such as a gearbox or continuously-variable transmission coupled to an endless belt, chain, or driveshaft assembly. The pair of front wheel assemblies 36 is suspended from the front of the frame through a suitable suspension assembly such as upper and lower A-arms with dampening mechanisms such as shock absorber and coil spring assemblies to increase ride comfort and vehicle stability. The front wheel assemblies 36 have road tires mounted thereon. A steering assembly 40 is coupled to the front wheel assemblies 36 and is supported by the frame for transmitting steering commands to the front wheel assemblies 36. The steering assembly 40 includes a steering column 41 and a handle bar 42.

A bodywork 50 covers the mechanical components of the three-wheel vehicle 20. The bodywork 50 includes a rear portion 52, a central portion 54 and a front portion 56. The rear portion 52 consists of the straddle seat 22, the handles 29, left and right fairing side panels 58 (only the right one being shown) disposed below and on each side of straddle seat 22, left and right rear turn signals 62 (only the right one being shown) and a rear deflector 60 to prevent ingress of debris or water thrown by the rear wheel assembly 32. The central portion 54 consists of an upper fairing 61 extending from the forward end of the straddle seat 22 to the steering assembly 40 and extending downwardly on both sides of vehicle 20 to cover the top portion of the engine 19. The upper fairing 61 extends rearward to merge with the side panels 58 below straddle seat 22. The central portion 54 also features left and right lower fairings 64 (only the right one being shown) merging with the side panels 59. The left lower fairing 64 protects the radiator of the vehicle whereas the right lower fairing 64 protects the oil cooler of the vehicle 20. The lower fairings 64 also enclose the lower portion of the engine 19 and the attachment points of the rear suspension 34. The front facing portion of the lower fairings 64 includes air intake openings (not shown) adapted to scoop and direct air towards the radiator and oil cooler to provide sufficient air flow for efficient heat exchange. The central portion 54 also includes an upper segment 74 surrounding the steering assembly 40 to which is mounted a windshield 76, at least one side view mirror 78 and a dashboard panel 80 for mounting various gauges and indicators. The upper segment 74 includes a pair of headlights 82 (only the right side being shown). The upper segment 74 of the central portion 54 extends from the upper fairing 61 to the front portion 56 of the bodywork 50 to enclose the steering column 41. All the elements of the rear and central portions 52 and 54 of bodywork 50 are typically secured directly onto the frame.

Left and right removable cargo boxes 53 (only the right one being shown) are mounted to a rear of the three-wheel vehicle 20 behind the pair of foot pegs 16. The cargo boxes 53 are generally aligned with the rear wheel assembly 32. The cargo box 53 is a hard case which is sized to fit at a rear of the vehicle 20. The cargo box 53 is adapted to carry various items during riding. The hard case prevents the items from being damaged as well as from becoming wet during rainy driving conditions. It is contemplated that the cargo boxes 53 could be soft case saddle bags, or being of another shape. It is contemplated that the cargo boxes 53 could be omitted.

A trailer 10 is removably connected to the three-wheel vehicle 20 by way of the trailer hitch 100 which is removably connected to the single rear wheel assembly 32. The trailer hitch 100 will be described in greater detail below. The trailer 10 is essentially a container 12 having a pair of wheels 11 (only the right side one being shown) for transporting items. An arm 13 extends from a front of the container 12 to connect to the trailer hitch 100 at connection point 14. Connection of the trailer 10 at the connection point 14 is achieved using a trailer connector such as a ball 15 on the hitch 100. Chains 115 (only the right being shown) are hooked at anchors points 116a, 116b. The chains 115 extend between the arm 13 and the anchors points 116a, 116b of the trailer hitch 100. The chains 115 provide added security of the attachment. It is contemplated that other types of connections between the trailer hitch 100 and the trailer 10 could be used, and that the chains 115 could be omitted.

As seen in FIGS. 2 and 3, the rear wheel assembly 32 is mounted on a swing arm 70. The swing arm 70 has a left arm 71a and a right arm 71b disposed on each side of the wheel 33. The arms 71a, 71b are connected to each other by the arm 71c. The arms 71a, 71b are hollow tubes of generally rectangular cross-section. It is contemplated that the arms 71a, 71b could be full and could have cross-sections different from rectangular cross-sections. The wheel 33 is rotatably mounted onto a rear wheel shaft 35 which extends between the left and right arms 71a, 71b. The rear wheel shaft 35 is hollow and has open ends 36a, 36b. The rear wheel shaft 35 is fastened to an external surface of the left and right arms 71a, 71b by left and right rear wheel fasteners 37a and 37b. The rear wheel fasteners 37a, 37b are nuts that are screwed on an external threaded surface of the open ends 36a, 36b of the rear wheel shaft 35. The rear wheel fasteners 37a, 37b secure the rear wheel shaft 35 to the swing arm 70. Is it contemplated that fasteners other than nuts could be used for the rear wheel fasteners 37a, 37b.

With reference to FIGS. 4 to 7, the trailer hitch 100 will now be described in more details. The trailer hitch 100 has left and right sides that are similar to each other. Accordingly, and for simplicity, left and right side elements are labelled with same the reference numerals but are followed by the letter 'a' for the left side elements and by the letter 'b' for the right side elements.

The trailer hitch 100 is removably mounted to the swing arm 70 of the single rear wheel assembly 32 via left and right mounting brackets 120a, 120b. The trailer hitch 100 comprises a left hitch arm 101a and a right hitch arm 101b. The left and right hitch arms 101a, 101b are hollow metallic tubes of rectangular cross-sections. It is also contemplated that the hitch arms 101a, 101b could have other types of cross-sections such as I-Shaped or be rounded. It is also contemplated that the hitch arms 101a, 101b could have a non uniform cross-section throughout. It is contemplated that the left and right hitch arms 101a, 101b could be full tubes and could be of other material than metal provided that they can sustain loads and forces exerted thereon during operation. The left and right hitch arms 101a, 101b are adapted to be connected to the left and right arms 71a, 71b respectively.

The hitch arms 101a, 101b have respective first ends 105a, 105b and second ends 104a, 104b. The second ends 104a, 104b of the left and right hitch arms 101a, 101b are integrally formed to a U-shaped hitch arm 103. It is contemplated that the second ends 104a, 104b of the left and right hitch arms 101a, 101b could be connected by welding to form the U-shaped hitch arm 103. It is also contemplated that the left and right hitch arms 101a, 101b could not be connected at their second ends 104a, 104b and could be two separate arms connected by a third arm. It is also contemplated that the U-shaped hitch arm 103 could have an additional arm extending from a rear of the U-shaped hitch arm 103 for connecting to the ball 15. A mud guard 21 (shown in FIG. 5) is affixed to the second ends 104a, 104b of the hitch arms 101a, 101b by fasteners 23. It is contemplated that the mud guard 21 could be omitted. The first ends 105a, 105b of the hitch arms 101a, 101b connect to their corresponding arms 71a, 71b, as will be described in greater detail below.

Figure 4:
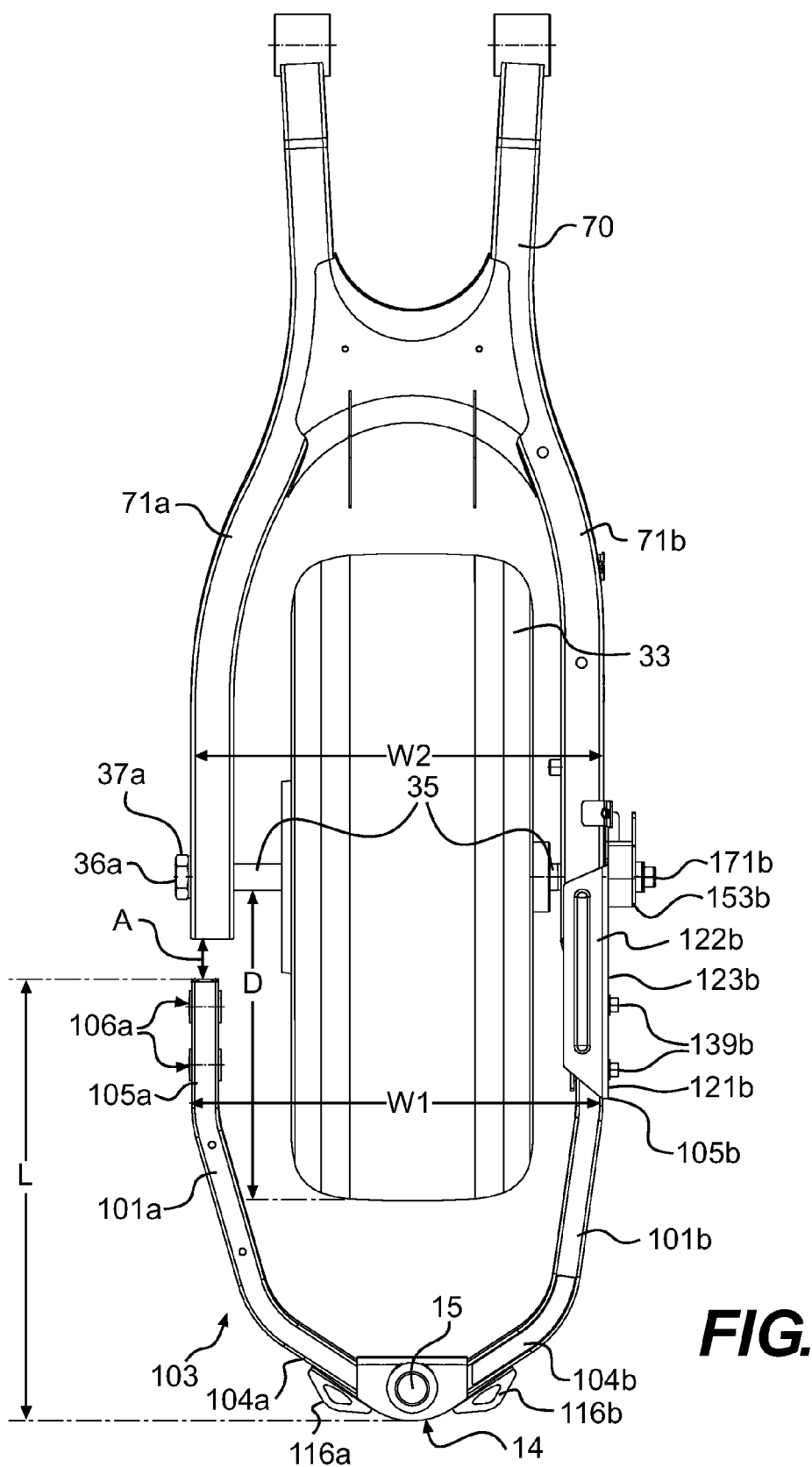
FIG. 4 is a top plan view of the single rear wheel assembly of FIG. 3 and of a trailer hitch according to an embodiment of the present invention with some elements of the trailer hitch removed for clarity.

As best seen in FIG. 4, when connected to the swing arm 70, the U-shaped hitch arm 103 is dimensioned to form an extension of the swing arm 70. In particular, the U-shaped hitch arm 103 is dimensioned such that a width W1 between the first ends 105a, 105b of the left and right hitch arms 101a, 101b is about the same as a width W2 between the left and right arms 71a, 71b. A length L of the U-shaped hitch arm 103 is longer than a distance D between a wheel center and a rearward most part of the single rear wheel assembly 32, such that the connection point 14 is located rearward of the single rear wheel assembly 32.

Figure 5:
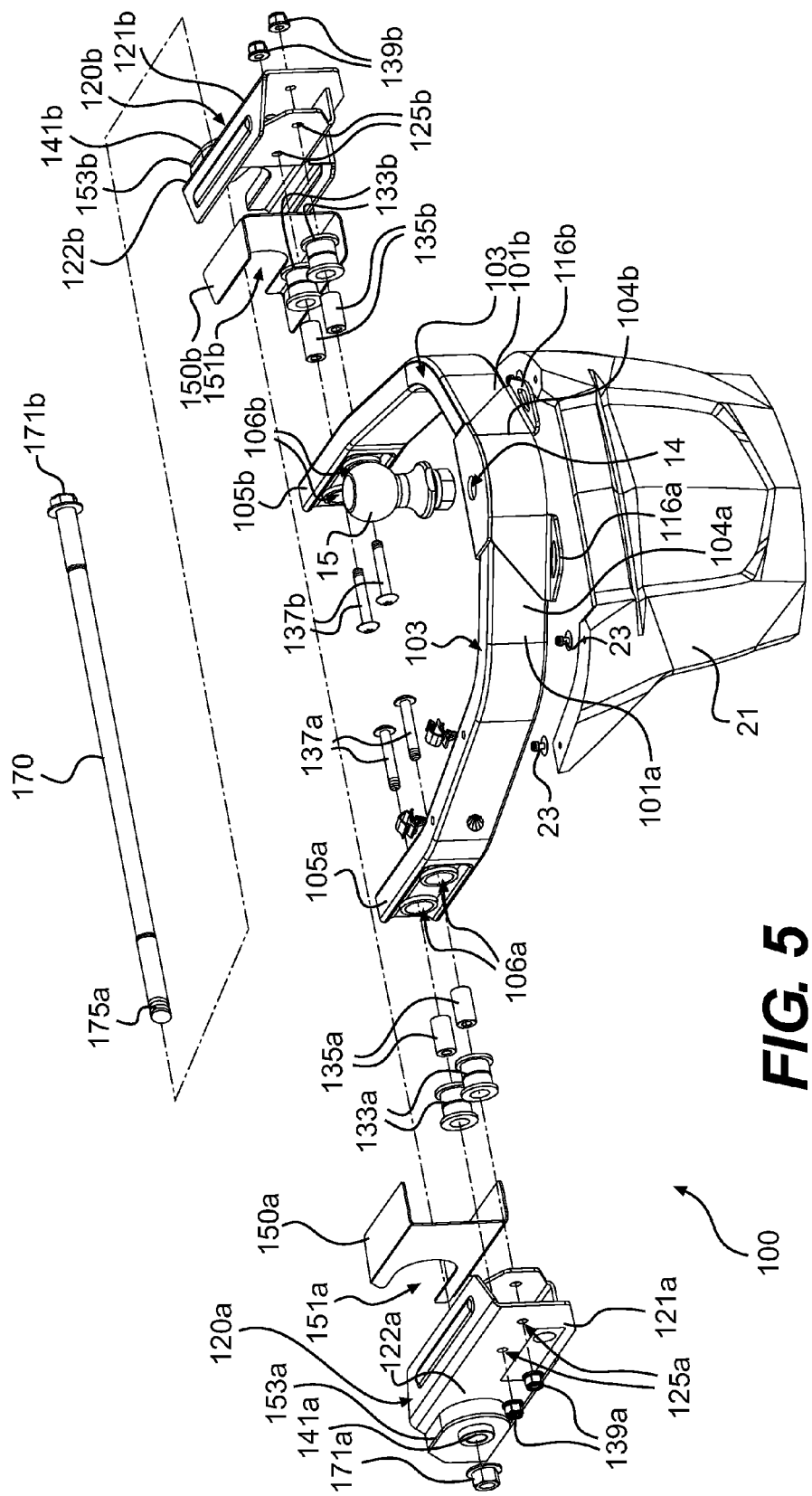
FIG. 5 is an exploded view of the trailer hitch of FIG. 4.
Figure 6:
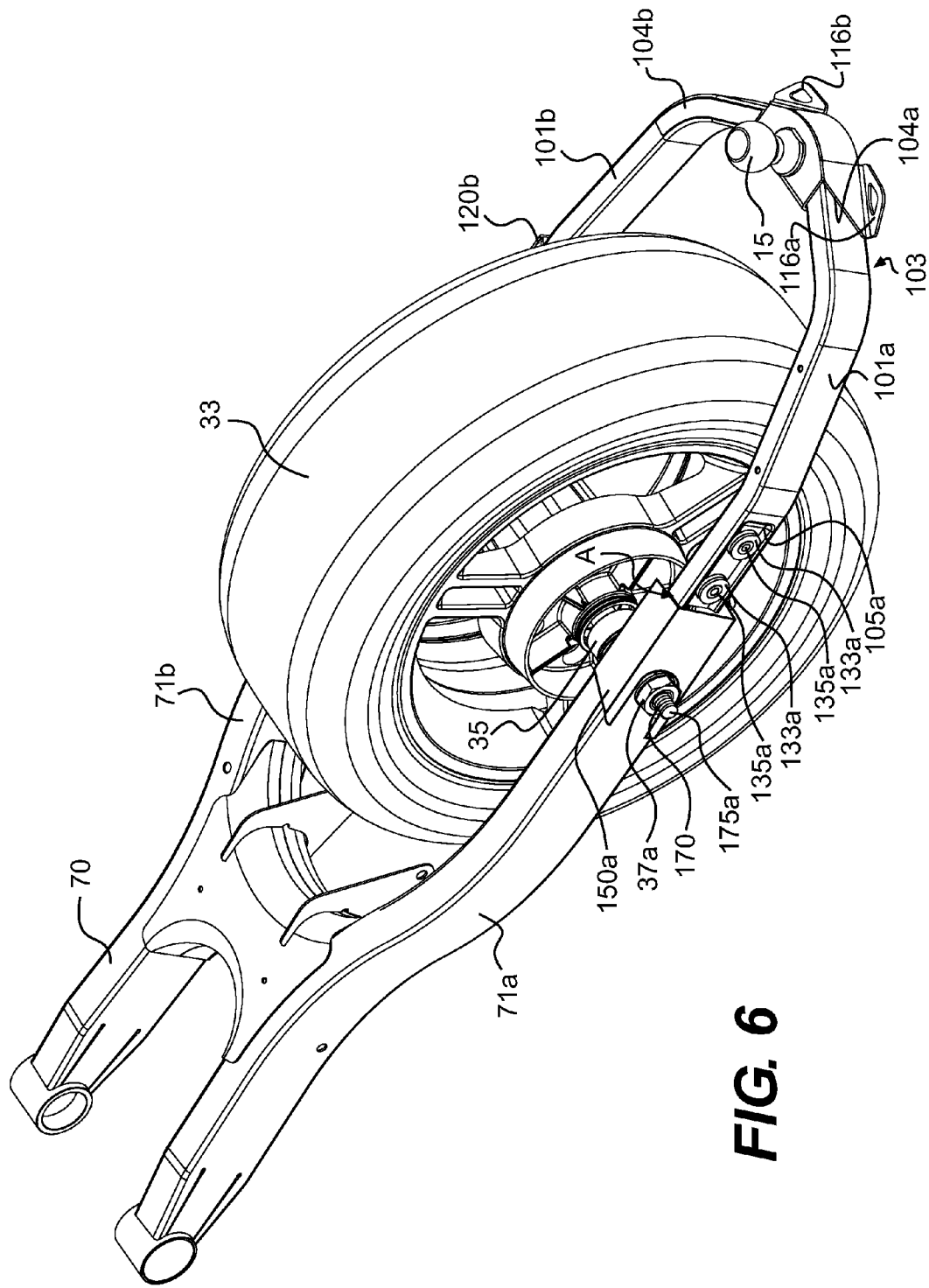
FIG. 6 is a rear, left perspective view of the single rear wheel assembly of FIG. 2 during assembly of the trailer hitch of FIG. 4 to the swing arm of the single rear wheel assembly.
Figure 7:
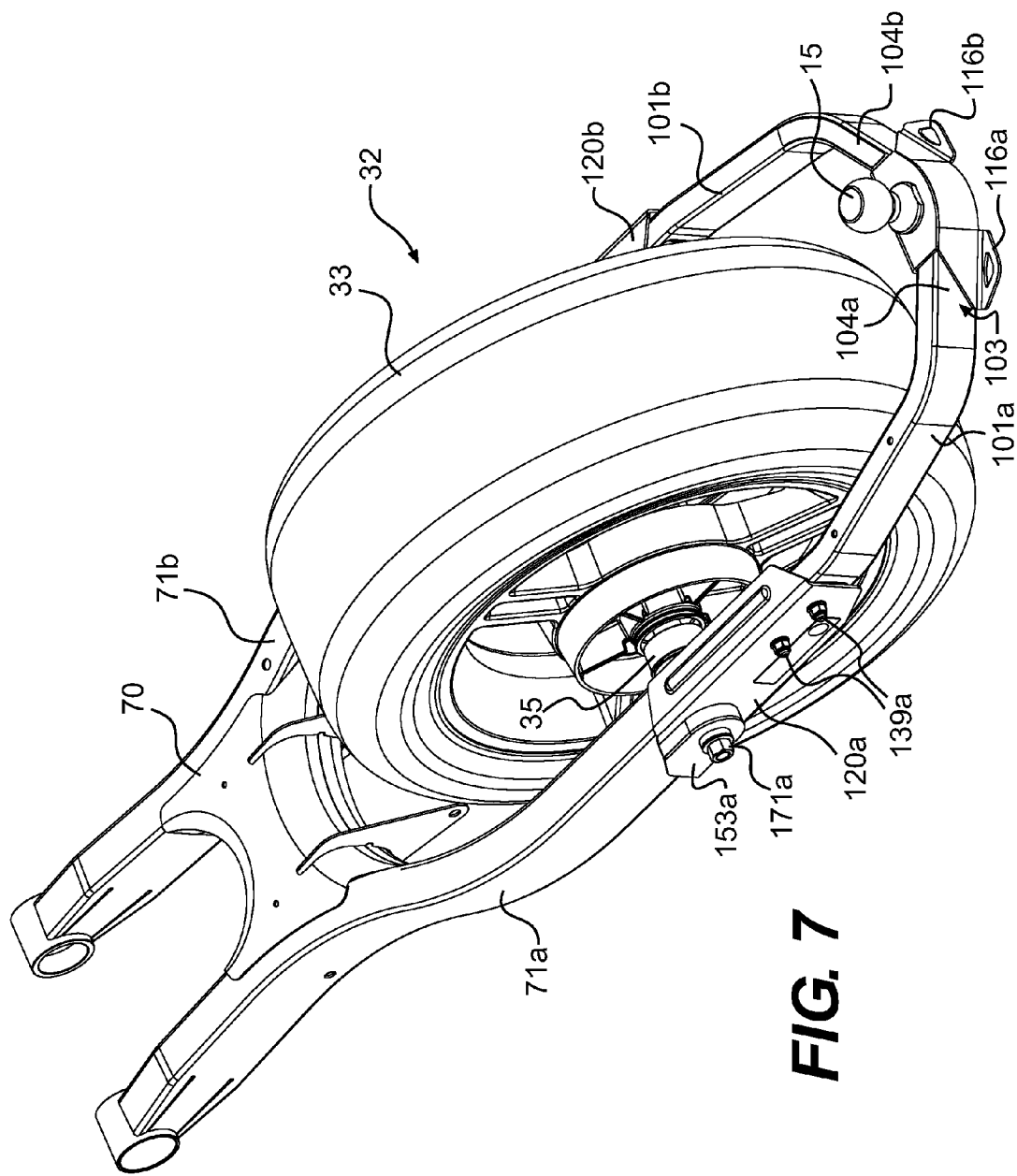
FIG. 7 is a rear, left perspective view of the single rear wheel of FIG. 2 with the trailer hitch of FIG. 4 attached to the swing arm of the single rear wheel assembly.

As best seen in FIG. 5 which shows an exploded view of the trailer hitch 100, each first end 105a, 105b of the left and right hitch arms 101a, 101b has a pair of apertures 106a, 106b. Shock-absorbing bushings 133a, 133b are inserted into each pair of the apertures 106a, 106b. The shock-absorbing bushings 133a, 133b are cylindrical rubber sleeves having flanges for abutting to outer lateral sides of the hitch arms 101a, 101b. It is contemplated that other shock-absorbing materials could be used for the bushings 133a, 133b, and that the bushings 133a, 133b could not have flanges. The shock-absorbing bushings 133a, 133b help absorb shocks and vibrations transmitted between the swing arm 70 and the trailer 10. The shock-absorbing bushings 133a, 133b deform when experiencing a force, thus dampening movement between the swing arm 70 and the trailer hitch 100, and therefore between the swing arm 70 and the trailer 10. For example, upon deceleration of the three-wheel vehicle 20, inertia forces push the trailer 10 toward the three-wheel vehicle 20, and the U-shaped hitch arm 103 is pushed by the trailer arm 13 toward the swing arm 70. The shock-absorbing bushings 133a, 133b compress and absorb at least part of this displacement. Similar situations are experienced during acceleration or unevenness of the road. The shock-absorbing bushings 133a, 133b recover their original shape and size once the applied force is withdrawn. The shock-absorbing bushings 133a, 133b are each protected from fasteners 137a, 137b by sleeves 135a, 135b. The sleeves 135a, 135b are metallic tubes that receive the fasteners 137a, 137b. The sleeves 135a, 135b have a smooth interior. The fasteners 137a, 137b are bolts which are at least partially threaded for receiving nuts 139a, 139b.

The mounting brackets 120a, 120b and the connection of first ends 105a, 105b of the trailer hitch 100 to the swing arm 70 by left and right mounting brackets 120a, 120b will now be described with respect to a left side only, the right side being a mirror image of the left side.

The left mounting bracket 120a is made of metal and has a first end 121a and a second end 122a. The first end 121a has a hollow rectangular cross section and is adapted to be inserted around the left hitch arm 101a. The second end 122a has a U-shaped cross section and is adapted to be disposed around three sides of the left arm 71a. It is contemplated that the first end 121a of the left mounting bracket 120a could have a U-shaped cross-section and be adapted to be disposed around three sides of the left hitch arm 101a. It should be understood that if the left hitch arm 101a or the left arm 71a had different shapes, the left mounting bracket 120a would have ends 121a and 122a modified accordingly. It is also contemplated that the left mounting bracket 120a could be made of a material other than metal.

The first end 121a of the left mounting bracket 120a comprises two apertures 125a which are aligned with the two apertures 106a in the first end 105a of the left hitch arm 101a. The fasteners 137a are inserted in each of the apertures 106a and 125a. Each nut 139a is secured onto its corresponding fastener 137a thereby fastening the first end 121a of the left mounting bracket 120a to the first end 105a of the left hitch arm 101a. It is contemplated that a single aperture in the left hitch arm 101a and in the left mounting bracket 120a could be used to connect the left mounting bracket 120a to the left hitch arm 71a. It should be understood, however, that by using two apertures, rotation between the U-shaped hitch arm 103 and the swing arm 70 is minimized. The second end 122a of the left mounting bracket 120a comprises an aperture 141a for connecting to the left arm 71a as described below. Connection of the second end 122a of the left mounting bracket 120a to the left arm 71a will be described in greater details below.

The second end 122a of the left mounting bracket 120a has a protrusion 153a around the aperture 141b. When the left mounting bracket 120a is mounted to the left hitch arm 101a and the left arm 71a, the protrusion 153a is disposed above the rear wheel shaft fasteners 37a. It is contemplated that the protrusion 153a could also abut the rear wheel shaft fasteners 37a.

A pad 150a is disposed between the second end 122a of the left mounting bracket 120a and the left arm 71a. The pad 150a is made of nylon and is used to avoid friction between the first end 121a of the left mounting bracket 120a and the first end 105a of the left hitch arm 101a. It is contemplated that the pad 150a could be omitted. The pad 150a has a squared U-shape similar to the left mounting bracket 120a. It should be understood that the pad 150a would not have a squared U-shape if the first end 105a of the left hitch arm 101a had a shape different from a generally rectangular cross-section. It is also contemplated that the pad 150a could be a flexible sheet that would be shaped to the first end 105a of the left hitch arm 101a upon application onto first end 105a of the left hitch arm 101a. Finally, it is contemplated that friction preventing materials other than nylon could be used. The pad 150a comprises an indentation 151a disposed partially around the rear wheel shaft fasteners 37a. It is contemplated that the pad 150a could be shorter and could not comprise the indentation 151a. Similarly, a pad 150b is disposed between the second end 122b of the right mounting bracket 120b and the right arm 71b.

A clamping shaft 170 is disposed inside the rear wheel shaft 35 and extends through the apertures 141a, 141b of the second ends 122a, 122b of the left and right mounting brackets 120a, 120b. The clamping shaft 170 has one threaded end 175a (shown left for illustration purposes). A nut 171a is screwed on the end 175a. A cotter pin (not shown) is used to prevent the nut 171a from becoming unfastened. The other end of the clamping shaft 170 has a hexagonal head 171b. It is contemplated that the clamping shaft 170 could have two threaded ends adapted to receive two nuts. The clamping shaft 170 connects the second ends 122a, 122b of the left and right mounting brackets 120a, 120b to the arms 71a, 71b of the swing arm 70. It is also contemplated that fastening the left and right mounting brackets 120a, 120b to the arms 71a, 71b could be achieved without using a clamping shaft 170. The second ends 122a, 122b of the mounting brackets 120a, 120b could connect to the arms 71a, 71b by with individual left and right bolts and nuts for example. The left mounting bracket 120a is designed such that, when the left mounting bracket 120a is mounted onto the left hitch arm 101a and onto the left arm 71a, a space A (shown in FIGS. 4 and 6) is left between the left hitch arm 101a and the left arm 71a. The space A compensates for displacements of the U-shaped hitch arm 103 with respect to the swing arm 70. The aperture A prevents friction and contact between the first end 105a of the left hitch arm 101a and the left arm 71a when the three-wheel vehicle 20 experiences steering, acceleration, deceleration or deviation due to unevenness of the road.

Mounting of the trailer hitch assembly 100 to the swing arm 70 will now be described. The U-shaped hitch arm 103 is provided with the shock-absorbing bushings 133a, 133b inserted in the apertures 106a, 106b of the hitch arms 101a, 101b. The sleeves 135a, 135b have also been inserted inside the shock-absorbing bushings 133a, 133b.

First, the first ends 121a, 121b of the mounting brackets 120a, 120b are inserted onto the first ends 105a, 105b of the hitch arms 101a, 101b. The apertures 106a, 106b are aligned to the apertures 125a, 125b. The first ends 121a, 121b of the mounting brackets 120a, 120b are fastened to the hitch arms 101a, 101b by inserting the bolts 137a, 137b into the apertures 106a, 106b and 125a, 125b, and securing them with the nuts 139a, 139b.

Second, the pads 150a, 150b are disposed on the arms 71a, 71b around the rear wheel fasteners 37a, 37b. The U-shaped hitch arm 103 with the mounting brackets 120a, 120b mounted thereon is then placed on the arms 71a, 71b such that the protrusions 153a, 153b are disposed over the rear wheel shaft fasteners 37a, 37b, and such that the apertures 141a, 141b are aligned with the open ends 36a, 36b of the rear wheel shaft 35.

Third, the clamping shaft 170 is introduced into the rear wheel shaft 35 by inserting the threaded end 175a of the clamping shaft 170 into the right aperture 141b of the right mounting bracket 120b. The clamping shaft 170 is slid inside the rear wheel shaft 35. Once the clamping shaft 170 is positioned inside the rear wheel shaft 35, the threaded end 175a extends through the left aperture 141a of the left mounting bracket 120a. The mounting brackets 120a, 120b are then secured to the arms 71a, 71b by securing the left mounting bracket 120a with the nut 171a onto the threaded end 175a. By tightening the nut 171a onto the clamping shaft 170, the right mounting bracket 120b is held tight in between the arm 71b and the head 171b.

Alternatively, the mounting brackets 120a, 120b could be first mounted to the arms 71a, 71b by way of the clamping shaft 170 and the nut 171a. The hitch arms 101a, 101b would then be slid into the first ends 121a, 121b of the mounting brackets 120a, 120b and fastened thereto.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A trailer hitch for a single rear wheeled vehicle, the single rear wheeled vehicle comprising a single rear wheel mounted between left and right arms, the trailer hitch comprising:
    a left hitch arm having first and second ends, the first end having a first aperture;
    a right hitch arm having first and second ends, the first end having a first aperture, the second end of the right hitch arm being connected to the second end of the left hitch arm;
    a left shock absorbing bushing disposed inside the first aperture of the first end of the left hitch arm;
    a right shock absorbing bushing disposed inside the first aperture of the first end of the right hitch arm;
    a left mounting bracket having first and second ends, the first end having a first aperture, the first end being fastened to the first end of the left hitch arm, the second end being adapted to connect to the left arm;
    a right mounting bracket having first and second ends, the first end having a first aperture, the first end being fastened to the first end of the right hitch arm, the second end being adapted to connect to the right arm;
    a left fastener fastening the left mounting bracket to the left hitch arm, the left fastener passing through the left shock absorbing bushing and through the first aperture of the first end of the left mounting bracket;
    a right fastener fastening the right mounting bracket to the right hitch arm, the right fastener passing through the right shock absorbing bushing and through the first aperture of the first end of the right mounting bracket; and
    a trailer connector connected to the second ends of the left and right hitch arms, the trailer connector being adapted to connect to a trailer.

2. The trailer hitch of claim 1, further comprising a left sleeve disposed between the left fastener and an inside of the left shock absorbing bushing; and
    a right sleeve disposed between the right fastener and an inside of the right shock absorbing bushing.

3. The trailer hitch of claim 1, further comprising a mud guard connected to the left and right hitch arms.

4. The trailer hitch of claim 1, wherein the left and right mounting brackets are adapted to prevent rotation between the left and right hitch arms and their corresponding left and right arms.

5. The trailer hitch of claim 1, wherein the left and right hitch arms are fixedly connected together to form a generally U-Shape.

6. The trailer hitch of claim 1, wherein the left and right hitch arms are integrally formed.

7. The trailer hitch of claim 1, wherein the first ends of the left and right hitch arms have a generally rectangular cross-section, and the first ends of the left and right mounting brackets are generally U-shaped.

8. The trailer hitch of claim 1, wherein when the left and right mounting brackets are connected to the left and right arms respectively the first ends of the left and right hitch arms are spaced from ends of the left and right arms respectively.

9. The trailer hitch of claim 2, wherein the left and right sleeves are first left and right sleeves, the left and right shock absorbing bushings are first left and right shock absorbing bushings, and the left and right fasteners are first left and right fasteners;
    wherein:
        the first end of the left hitch arm has a second aperture;
        the first end of the right hitch arm has a second aperture;
        the first end of the left mounting bracket has a second aperture; and
        the first end of the right mounting bracket has a second aperture; and
    further comprising:
        a second left shock absorbing bushing disposed inside the second aperture of the first end of the left hitch arm;
        a second right shock absorbing bushing disposed inside the second aperture of the first end of the right hitch arm;
        a second left sleeve disposed inside the second left bushing;
    a second right sleeve disposed inside the second right bushing;
        a second left fastener fastening the left mounting bracket to the left hitch arm, the second left fastener passing through the second aperture of the first end of the left mounting bracket and the second left sleeve; and
        a second right fastener fastening the right mounting bracket to the right hitch arm, the second right fastener passing through the second aperture of the first end of the right mounting bracket and the second right sleeve.

10. The trailer hitch of claim 1, wherein the single rear wheel is mounted onto a rear wheel shaft, the rear wheel shaft being hollow and open ended;
    at least one fastener fastens the left mounting bracket to the left arm and the right mounting bracket to the right arm.

11. The trailer hitch of claim 10, further comprising an aperture at the second end of the left mounting bracket and an aperture at the second end of the right mounting bracket;

the at least one fastener including a clamping shaft extending between the left and right arms, the clamping shaft fastening the second ends of the left and right mounting brackets to corresponding left and right arms, the clamping shaft being adapted to be disposed inside the rear wheel shaft, the clamping shaft extending through the aperture of the second ends of the left and right mounting brackets.

12. The trailer hitch of claim 11, wherein the rear wheel shaft is connected to the left and right arms by left and right rear wheel fasteners respectively;

the second end of the left mounting bracket comprises a protrusion disposed around the aperture of the second end of the left mounting bracket, the left rear wheel fasteners being disposed between the left arm and the protrusion; and the second end of the right mounting bracket comprises a protrusion disposed around the aperture of the second end of the right mounting bracket, the right rear wheel fasteners being disposed between the right arm and the protrusion.

13. The trailer hitch of claim 12, further comprising:

a left pad disposed between the second end of left mounting bracket and the left arm, the left pad comprising an indentation such that the left pad is disposed at least partially around the left rear wheel shaft fasteners; and a right pad disposed between the second end of left mounting bracket and the left arm, the right pad comprising an indentation such that the right pad is disposed at least partially around the right rear wheel shaft fasteners.

14. A single rear wheel vehicle comprising:

a frame having a front portion and a rear portion;

an engine supported by the frame;

at least two wheels connected to the frame, at least one of the at least two wheels being operatively connected to the engine to propel the vehicle, at least one of the at least two wheels being a rear wheel;

a steering assembly supported by the frame and being operatively connected to at least one of the at least two wheels to steer the vehicle;

a rear suspension arm connected to the frame, the rear wheel being mounted on the rear suspension arm, the rear suspension arm comprising left and right arms; and a trailer hitch connected to the rear suspension arm, the trailer hitch having:

a left hitch arm having first and second ends, the first end having a first aperture;

a right hitch arm having first and second ends, the first end having a first aperture, the second end of the right hitch arm being connected to the second end of the left hitch arm;

a left shock absorbing bushing disposed inside the first aperture of the first end of the left hitch arm;

a right shock absorbing bushing disposed inside the first aperture of the first end of the right hitch arm;

a left mounting bracket having first and second ends, the first end having a first aperture, the first end being fastened to the first end of the left hitch arm, the second end being connected to the left arm;

a right mounting bracket having first and second ends, the first end having a first aperture, the first end being fastened to the first end of the right hitch arm, the second end being connected to the right arm;

a left fastener fastening the left mounting bracket to the left hitch arm, the left fastener passing through the left shock absorbing bushing and through the first aperture of the first end of the left mounting bracket;

a right fastener fastening the right mounting bracket to the right hitch arm, the right fastener passing through the right shock absorbing bushing and through the first aperture of the first end of the right mounting bracket; and a trailer connector connected to the second ends of the right and left hitch arms, the trailer connector being adapted to connect to a trailer.

\* \* \* \* \*